US012623491B2

(12) United States Patent
De Castro Pinho et al.

(10) Patent No.: US 12,623,491 B2
(45) Date of Patent: May 12, 2026

(54) PNEUMATIC VEHICLE TIRE HAVING A REINFORCING LAYER WITH STEEL MONOFILAMENTS

(71) Applicant: Continental Reifen Deutschland GmbH, Hannover (DE)

(72) Inventors: Daniel De Castro Pinho, Hohenhameln (DE); Mihail Catana, Hannover (DE); Thomas Kramer, Herford (DE); Michael Schunack, Hannover (DE)

(73) Assignee: Continental Reifen Deutschland GmbH, Hannover (DE)

( * ) Notice: Subject to any disclaimer, the term of this patent is extended or adjusted under 35 U.S.C. 154(b) by 0 days.

(21) Appl. No.: 18/869,589

(22) PCT Filed: Apr. 24, 2023

(86) PCT No.: PCT/DE2023/200080
§ 371 (c)(1),
(2) Date: Nov. 26, 2024

(87) PCT Pub. No.: WO2023/232201
PCT Pub. Date: Dec. 7, 2023

(65) Prior Publication Data
US 2025/0296387 A1     Sep. 25, 2025

(30) Foreign Application Priority Data

May 31, 2022    (DE) ........................ 10 2022 205545.4

(51) Int. Cl.
*B60C 9/20*         (2006.01)
*B60C 9/00*         (2006.01)

(52) U.S. Cl.
CPC .......... B60C 9/0064 (2013.01); B60C 9/0007 (2013.01); B60C 9/2006 (2013.01); *B60C 2009/0014* (2013.01); *B60C 2009/0021* (2013.01); *B60C 2009/0085* (2013.01); *B60C 2009/2077* (2013.01); *B60C 2009/2083* (2013.01); *B60C 2009/209* (2013.01)

(58) Field of Classification Search
CPC ................ B60C 9/0064; B60C 1/0041; B60C 2001/0066; B60C 2009/0031; B60C 2009/2083; B60C 2009/2077
See application file for complete search history.

(56) References Cited

U.S. PATENT DOCUMENTS

| | | | | |
|---|---|---|---|---|
| 5,858,137 A | * | 1/1999 | Assaad | B60C 9/0064 |
| | | | | 152/526 |
| 2012/0312441 A1 | * | 12/2012 | Harikae | B60C 9/0007 |
| | | | | 152/527 |
| 2013/0206302 A1 | * | 8/2013 | Yasuda | B60C 9/0064 |
| | | | | 152/451 |
| 2014/0171564 A1 | * | 6/2014 | Torbruegge | C08K 3/04 |
| | | | | 524/184 |
| 2015/0314647 A1 | * | 11/2015 | Kakizawa | B60C 9/0007 |
| | | | | 152/527 |
| 2020/0181356 A1 | | 6/2020 | Barbouteau | |
| 2023/0151190 A1 | * | 5/2023 | Eichhorst | C08L 7/00 |
| | | | | 524/398 |
| 2025/0162350 A1 | * | 5/2025 | Onoue | B60C 1/00 |

FOREIGN PATENT DOCUMENTS

| | | | | | |
|---|---|---|---|---|---|
| DE | 102016225231 A1 | 5/2018 | | | |
| EP | 1491363 A1 | 12/2004 | | | |
| EP | 2521657 B1 | 5/2015 | | | |
| EP | 2723585 B1 | 9/2017 | | | |
| EP | 3868575 A1 | * | 8/2021 | ........... | D07B 1/0606 |
| WO | WO-2021197653 A1 | * | 10/2021 | ................ | C08L 7/00 |

OTHER PUBLICATIONS

The International Search Report and the Written Opinion of the International Searching Authority mailed Jun. 28, 2023 on for the PCT Application No. PCT/DE2023/200080 which this application claims priority.

* cited by examiner

*Primary Examiner* — Robert C Dye

(74) *Attorney, Agent, or Firm* — Richard A. Wolf; Gregory Adams

(57)     ABSTRACT
A pneumatic vehicle tire having a strength member ply comprising steel monofilaments having a cross-sectional area of 98 mm$^2$ to 125 mm$^2$ per meter of strength member ply, the steel has a carbon content of at least 0.86% by weight. To improve rolling resistance the monofilaments have a brass coating having a copper content of 61% by weight to 70% by weight and a zinc content of 30% by weight to 39% by weight, in that the monofilaments have a linear density of 92 g/100 m to 105 g/100 m, and the monofilaments each have a tensile density Td of 34 MPa/(g/100 m) to 39 MPa/(g/100 m). The strength member ply has an areal strength AS of 109 Nmm$^2$ to 166 Nmm$^2$, and the rubber material has a breaking elongation of 300% to 450%.

17 Claims, No Drawings

PNEUMATIC VEHICLE TIRE HAVING A REINFORCING LAYER WITH STEEL MONOFILAMENTS

This application is a National Stage Application under 35 U.S.C. § 371 of International Patent Application No. PCT/DE2023/200080 filed on Apr. 24, 2023, and claims priority from German Patent Application No. 10 2022 205 545.4 filed on May 31, 2022, the disclosures of which are herein incorporated by reference in their entireties.

The invention relates to a pneumatic vehicle tire, especially of radial construction, having a strength member ply comprising strength members made of steel which are arranged within the strength member ply substantially parallel and spaced apart from another and are embedded in a rubber material, wherein each of the strength members is configured as a monofilament, wherein the monofilaments occupy a cross-sectional area of 98 mm$^2$ to 125 mm$^2$ per meter of strength member ply and wherein the steel has a carbon content of at least 0.86% by weight.

A pneumatic vehicle tire generally comprises an air-impermeable inner layer, a carcass comprising at least one carcass strength member ply, wherein the carcass extends from the zenith region of the tire via the sidewalls into the bead region and is anchored there by being looped around tension-resistant bead cores, a radially outwardly arranged profiled tread and a belt comprising belt strength member plies which is arranged between the tread and the carcass and which may be radially outwardly covered with a belt bandage. The belt bandage may be a single-ply or multi-ply belt bandage and covers at least the belt edges.

It is customary that for production of a strength member ply, in particular of the belt or the carcass, strength members are embedded in rubber material by running a set of substantially parallel strength members in the longitudinal direction through a calendar or an extruder for sheathing with the rubber material. These continuous webs are generally cut transversely to their longitudinal direction so that these parts may be employed in the tire as strength member plies individually or joined together.

The belt generally comprises at least two belt strength member plies which are arranged such that they cross at an angle. The belt ensures the stiffness of the tread in the longitudinal and transverse direction. During driving this aids power transmission, improves lateral control, and reduces tire abrasion.

The carcass comprises at least one carcass strength member ply, wherein in the case of a pneumatic vehicle tire of radial construction the strength members of the at least one carcass ply in the sidewalls are arranged at an angle of 0° to 10°, preferably of 0° to 8°, to the radial direction.

It is known and customary for steel cords to be used as strength members of the belt. Belt strength member plies installed in pneumatic passenger car tires often have steel cords composed of a plurality of high-tensile steel filaments, for example of construction 2×, 3×, 2+1 etc. The disadvantage of belt strength member plies comprising the aforementioned steel cords is that they are relatively thick and heavy in weight which has an adverse effect on rolling resistance.

To achieve thinner, rolling resistance-optimized strength member plies it is also known to employ thin steel monofilaments having a high strength member density. Thus, DE 10 2016 225231 A1 discloses a belt strength member ply comprising ultra-tensile steel monofilaments having a small diameter of 0.35 mm which, to compensate the small diameter, are arranged in the strength member ply at a high thread density of 90 epdm to 130 epdm.

However, the elevated thread density to compensate the relatively low strength of the thin monofilaments compared to the cords composed of a plurality of steel filaments results in different challenges which affect for example the service life of the tire due to the high number of strength members and the lower strength member spacing. The high thread density can result in elevated crack formation and crack propagation. The deformation characteristics of the strength member ply and thus in particular the handling characteristics of the tire are also influenced by the configuration of the strength members.

The primary object of the present invention was that of overcoming or at least reducing the above-described disadvantages of the prior art.

It is accordingly an object of the present invention to provide a pneumatic vehicle tire which exhibits improved durability while retaining advantageous rolling resistance.

This is achieved in that the monofilaments have a brass coating having a copper content of 61% by weight to 70% by weight and a zinc content of 30% by weight to 39% by weight, in that the monofilaments each have a linear density of 92 g/100 m to 105 g/100 m, in that the monofilaments each have a tensile density Td of 34 MPa/(g/100 m) to 39 MPa/(g/100 m), in that the strength member ply has an areal strength AS of 109 Nmm$^2$ to 166 Nmm$^2$ and in that the rubber material has a breaking elongation of 300% to 450%. The areal strength AS of a strength member ply is defined as the product of a breaking strength and a diameter of a strength member of the strength member ply and a spacing between the strength member and an adjacent strength member of the strength member ply. The spacing plus the diameter are thus the repeat spacing of the strength members. The breaking strength of the strength member is measured according to ASTM D 2969.

The cross-sectional area of a monofilament runs perpendicular to an extension direction of the monofilament. In the context of the invention the tensile density Td of a strength member is the quotient of the tensile strength and the linear density of the respective strength member. Tensile strength is measured according to ASTM D 2969.

The breaking elongation of the rubber material is measured at room temperature according to DIN 53504.

The high carbon content of the steel of the monofilaments of at least 0.86% by weight results in an advantageous high tensile strength of the monofilaments. The formation of the strength members as monofilaments allows particularly good penetration with the rubber material which avoids the corrosion propagation promoted by the high carbon content. At the same time the implementation of the strength members as monofilaments still allows a thin configuration of the strength member ply and thus still allows a low rolling resistance. The brass coating of the monofilaments having a copper content of 61% by weight to 70% by weight and a zinc content of 30% by weight to 39% by weight promotes optimum adhesion between the steel and the rubber material. This altogether results in an improved durability of the tire coupled with a low rolling resistance.

The relatively high linear density of the monofilaments, measured in g per 100 m length of the respective monofilament, of 92 g/100 m to 105 g/100 m leads to improved compression characteristics and thus to improved handling characteristics when used as a belt ply. At the same time this high linear density in conjunction with the low tensile density Td of 34 MPa/(g/100 m) to 39 MPa/(g/100 m) ensures reduced signs of fatigue and thus greater durability.

It has been found that the interaction between the strength members and the rubber material which sheathes the strength members, in particular the amount of sheathing rubber material and the breaking elongation thereof, is particularly important for the tire characteristics. The areal strength thus takes into account and combines the breaking strength with the diameter of the monofilaments and with the spacing to an adjacent monofilament. It has been found that an areal strength AS of 109 Nmm² to 166 Nmm² in conjunction with the high linear density according to the invention and the breaking elongation of the rubber material, especially arranged between the strength members, of 300% to 450% allows an exceptional compromise between service life, handling characteristics and robustness of the tire. Such a strength carrier ply exhibits improved characteristics in terms of crack formation and crack propagation.

The invention accordingly provides a pneumatic vehicle tire which through the arrangement and weight distribution of steel to rubber material in the strength member ply and the material characteristics of the rubber material still provides an advantageous rolling resistance coupled with improved durability. The advantages are particularly apparent in the case of a vehicle tire which comprises the strength member ply as a belt ply. Such a pneumatic vehicle tire has advantageous handling characteristics.

Compared to a strength member ply having strength members of a customary 2× high-tensile construction it is possible to produce a pneumatic vehicle tire that exhibits improvements in rolling resistance, in handling and plunger, still coupled with advantageous service life and robustness of the tire.

An advantageous embodiment is provided in that the monofilaments have a compression modulus of 138 GPa to 155 GPa and/or a compression displacement of 0.95% to 1.05% and/or a compression stress of 1400 MPa to 1500 MPa.

It has been found that this combination of steel monofilaments and rubber material in the strength member ply together with the compression modulus of 138 GPa to 155 GPa and/or the compression displacement of 0.95% to 1.05% and/or the compression stress of 1400 MPa to 1500 MPa makes it possible to achieve a high compression strength up to creasing of the monofilaments. This results in further improved deformation characteristics of the strength member ply. When used as a belt ply this accordingly results in a pneumatic vehicle tire which is further improved in terms of handling characteristics. It is advantageous when the monofilaments have a compression modulus of 138 GPa to 155 GPa and a compression displacement of 0.95% to 1.05% and a compression stress of 1400 MPa to 1500 MPa.

Determination of the compression modulus, the compression displacement and the compression stress of a steel strength member, in particular of a monofilament, are known to a person skilled in the art. To determine the respective feature of the monofilament a sample of a rubber cylinder, in particular a rubber cylinder composed of the same rubber material as the rubber material of the strength member ply, comprising the monofilament arranged along the rotational axis of the cylinder is generally tested in comparison with a sample composed of a corresponding rubber cylinder free from such a monofilament. The respective cylinder may have a diameter of 15 mm and a length of 25 mm and the test may be performed at room temperature with a pre-load of 2 N and a test speed of 5 mm/min. To determine the compression characteristics of the monofilament the difference between the two samples with and without monofilament is to be considered.

An advantageous embodiment is provided in that the monofilaments each have an out-of-plane bending stiffness of 270 Nmm² to 340 Nmm².

It has been found that the inventive combination of steel monofilaments and rubber material in the strength member ply together with the high out-of-plane bending stiffness of the monofilaments of in each case 270 Nmm² to 340 Nmm² results in a pneumatic vehicle tire optimized in terms of the deformation characteristics of the strength member ply. When used as a belt ply this accordingly results in a pneumatic vehicle tire which is further optimized in terms of handling characteristics.

The bending stiffness of a steel strength member, in particular of the monofilament, is determinable by the 3-point bending test known to those skilled in the art. The bending stiffness of the monofilament is determined in this case as a result of a force acting on the strength member perpendicular to the extension direction of the monofilament. A linear piece of monofilament is tested in this case, wherein the test length and the distance between two contact points on which the monofilament is supported depends on the linear density of the monofilament.

An advantageous embodiment is provided in that the monofilaments each have a tensile strength of 3500 MPa to 3700 MPa, preferably in that a force of 285 N to 325 N must be applied for an elongation of 1%.

The monofilaments of such tensile strength exhibit an advantageous high breaking strength. The tensile strength and the force at 1% elongation are measured according to ASTM D 2969.

An advantageous embodiment is provided in that the strength member ply has a weight fraction of steel of 47% by weight to 63.5% by weight, preferably of 48.9% by weight to 62.3% by weight, particularly preferably of 52% by weight to 58% by weight, and in that the strength member ply has a spacing factor S of 2.00 to 2.67, preferably of 2.05 to 2.57, particularly preferably of 2.10 to 2.50.

In the context of the invention the spacing factor is defined as:

$$S = 1 + ((y + y' + x)/(2 \times d)),$$

wherein y is a thickness of the strength member ply on a first side of a monofilament of the strength member ply, y' is a thickness of the strength member ply on an opposite second side of the monofilament, in each case measured perpendicularly to an areal extent of the strength member ply, x is the spacing between the monofilament and an adjacent monofilament of the strength member ply and d is the diameter of the monofilament. y and y' are measures of the rubberization thickness of the strength member ply above and below the cord, wherein y+y'+d is the total thickness of the strength member ply measured perpendicularly to the areal extent of the strength member ply. Furthermore, d+x defines the repeat spacing (pitch) of the monofilaments.

The spacing factor S takes into account the sheathing of the monofilaments with the rubber material of the strength member ply. The spacing factor S characterizes the strength member ply, in particular in terms of the probability of crack propagation and the absorption of shear forces.

The high linear density of the monofilaments of 92 g/100 m to 105 g/100 m together with the high cross-sectional area of the monofilaments of 98 mm² to 125 mm² per meter of strength member ply make it possible to achieve in conjunction with the relatively moderate weight fraction of steel in the strength member ply of 47% by weight to 63.5% by weight, preferably of 48.9% by weight to 62.3% by weight, particularly preferably of 52% by weight to 58% by weight, a strength member ply which is advantageous in terms of ply thickness and ply weight as well as in terms of rolling resistance and is especially suitable as a belt ply. In connection with the spacing factor S of 2.00 to 2.67, preferably of 2.05 to 2.57, particularly preferably of 2.10 to 2.50, which further characterizes the sheathing of the monofilaments with the rubber material and allows an advantageous absorption of shear forces by the sheathing rubber material, as well as the breaking elongation of 300% to 450% of the sheathing rubber material, the strength member ply configured in this way also exhibits reduced crack formation and crack propagation, thus further improving the durability of the strength member ply.

An advantageous embodiment is provided in that the monofilaments are free from a twist about their axis.

This enables a stable sheathing process of the strength members with the rubber material. This simultaneously facilitates the orientation and uniform distribution of the monofilaments within the strength member ply. It is preferable when the strength member ply comprises the same amount of rubber material above and below the strength members.

An advantageous embodiment is provided in that the monofilaments have a twist angle of not more than 10°, preferably of not more than 1°.

Such a low twist angle of not more than 10° has only a minor effect on the characteristics of the monofilament. Such a low twist makes it possible to achieve a stable sheathing process of the strength members with the rubber material. A twist angle of not more than 1° is particularly advantageous. This simultaneously facilitates the orientation and uniform distribution of the monofilaments within the strength member ply.

The twist angle is calculated as $\mathrm{atan}(\pi \times d/P) \times 180/\pi$, wherein d is a diameter of the monofilament and P is a twist spacing (pitch) of the twist. To this end the monofilament may be analyzed using an optical microscope. The diameter d (in millimeters) and a value that corresponds to half of the twist spacing P (in millimeters) may be determined in this case. The value is determined using a draw marking on the surface of the monofilament. The value is multiplied by 2 to obtain the twist spacing P.

It is preferable when the strength member ply comprises the same amount of rubber material above and below the strength members.

An advantageous embodiment is provided in that the rubber material has a tensile strength of 15 N/mm² to 22 N/mm².

The tensile strength of the rubber material is measured at room temperature according to DIN 53504. Such a tensile strength allows an advantageous compromise between the service life and the rolling resistance characteristics of the strength member ply, in particular of the belt ply, of the tire.

An advantageous embodiment is provided in that the rubber material has a Shore hardness of 77 to 81 (Shore A).

The Shore hardness of the rubber material is measured at room temperature according to DIN 53505. Such a Shore hardness allows an advantageous compromise between the service life and the rolling resistance characteristics of the strength member ply, in particular of the belt ply, of the tire.

An advantageous embodiment is provided in that the rubber material has a rebound elasticity of 38 to 45.

The rebound elasticity of the rubber material is measured at room temperature according to DIN 53512. Such a rebound elasticity allows an advantageous compromise between the service life and the rolling resistance characteristics of the strength member ply, in particular of the belt ply, of the tire.

An advantageous embodiment is provided in that the pneumatic vehicle tire comprises a belt and in that the strength member ply is a strength member ply of the belt, preferably in that the belt comprises two such strength member plies, whose strength members cross at an angle of 18° to 45°.

A pneumatic vehicle tire comprising such a belt comprising at least one strength member ply according to the invention as a belt strength member ply has advantageous durability characteristics and handling characteristics coupled with good rolling resistance. It is especially a tire of radial construction.

The vehicle tire comprising the belt configured according to the invention is preferably a tire for a passenger car, a light truck or a commercial vehicle. It is preferable when a passenger car or a light truck is concerned.

An advantageous embodiment is provided in that the pneumatic vehicle tire, especially of radial construction, comprises a carcass and in that the strength member ply is a strength member ply of the carcass.

A pneumatic vehicle tire, especially of radial construction, comprising a carcass comprising at least one strength member ply according to the invention as a carcass strength member ply has advantageous durability characteristics and handling characteristics coupled with good rolling resistance. If a pneumatic vehicle tire of radial construction is concerned the strength members of the carcass strength member ply in the sidewalls are arranged at an angle of 0° to 10°, preferably of 0° to 8°, with respect to the radial direction.

The vehicle tire, especially of radial construction, comprising the carcass configured according to the invention is preferably a tire for a passenger car, a light truck, a commercial vehicle or the like. The tire is particularly preferably a pneumatic vehicle tire for a passenger car. Motor vehicles propelled by an electric motor, in particular such passenger cars, comprising one or more tires according to the invention particularly benefit from a low rolling resistance coupled with improved handling characteristics and improved durability.

All of the embodiments of the pneumatic vehicle tire according to the invention reproduced in this description are examples of the configuration of the invention and should be seen as non-limiting. Accordingly, further embodiments of the invention, which are the subject matter of the invention, unless explicitly explained otherwise in the description, are also provided by individual features or a plurality of features of one embodiment alone or by the combination of the features of different embodiments. Furthermore, combinations of preferred and particularly preferred embodiments can also be combined with one another.

The following provides an exemplary embodiment of a pneumatic vehicle tire according to the invention. What is concerned is a pneumatic vehicle tire of radial construction having a strength member ply comprising strength members made of steel which are arranged within the strength member ply substantially parallel and spaced apart from one another and are embedded in a rubber material, wherein each of the strength members is configured as a monofilament, wherein the monofilaments occupy a cross-sectional area of 98 mm² to 125 mm² per meter of strength member ply and wherein the steel has a carbon content of at least 0.86% by weight.

The tire is characterized in that the monofilaments have a brass coating having a copper content of 61% by weight to 70% by weight and a zinc content of 30% by weight to 39% by weight, in that the monofilaments each have a linear density of 92 g/100 m to 105 g/100 m, in that the mono-filaments each have a tensile density Td of 34 MPa/(g/100 m) to 39 MPa/(g/100 m), wherein the tensile density Td is defined as the quotient of the tensile strength and the linear density of the strength member, in that the strength member ply has an areal strength AS of 109 Nmm$^2$ to 166 Nmm$^2$, wherein the areal strength AS is defined as the product of a breaking strength and a diameter of a monofilament of the strength member ply and a spacing between the monofila-ment and an adjacent monofilament of the strength member ply and in that the rubber material has a breaking elongation of 300% to 450%.

The monofilaments may have a compression modulus of 138 GPa to 155 GPa, a compression displacement of 0.95% to 1.05% and/or a compression stress of 1400 MPa to 1500 MPa. The monofilaments may have an out-of-plane bending stiffness of in each case 270 Nmm$^2$ to 340 Nmm$^2$. The monofilaments may each have a tensile strength of 3500 MPa to 3700 MPa and it is preferable when a force of 285 N to 325 N must be applied for an elongation of 1%.

The strength member ply may have a weight fraction of steel of 47% by weight to 63.5% by weight, preferably of 48.9% by weight to 62.3% by weight, particularly preferably of 52% by weight to 58% by weight, wherein the strength member ply has a spacing factor S of 2.00 to 2.67, preferably of 2.05 to 2.57, particularly preferably of 2.10 to 2.50.

The monofilaments may have a twist angle of not more than 10°, preferably of not more than 1°. The monofilaments may be free from a twist about their own axis.

The rubber material of the strength member ply may have a tensile strength of 15 N/mm$^2$ to 22 N/mm$^2$. The rubber material of the strength member ply may have a Shore hardness of 77 to 81 (Shore A). The rubber material of the strength member ply may have a rebound elasticity of 38 to 45.

Such a pneumatic vehicle tire is particularly advantageous if the strength member ply is a belt ply. It is yet more advantageous when both belt plies which cross at an angle of 18° to 45° are configured in such a way. However, an above-described strength member ply may also be a carcass ply of a pneumatic vehicle tire.

Tire tests were performed to determine the tire durability of tires. The tires concerned are pneumatic vehicle tires of radial construction of 175/65 R15 in size in each case having two belt plies. The belt plies are configured as strength member plies comprising strength members made of steel which are arranged within the respective strength member ply substantially parallel and spaced apart from one another and are embedded in a rubber material. The strength mem-bers of the two belt plies of the respective tire cross at an angle of 18° to 45°.

Noninventive comparative tires (reference tire 1, refer-ence tire 2) and inventive tires (example tires) were tested. The reference tires 1, the reference tires 2 and the example tires differ from one another only in the configuration of their belt plies.

Table 1 lists the parameters of a belt ply/of a strength member (SM) of the belt ply of a reference tire 1, reference tire 2 and of an inventive example tire.

Table 2 provides a comparative assessment of the char-acteristics of the tested tires.

The belt ply of an inventive example tire listed in table 1 comprises as strength members monofilaments, wherein the steel has a carbon content of at least 0.86% by weight. The monofilaments have a twist angle of not more than 1°. They are especially free from a twist about their axis. The strength member ply especially has a weight fraction of steel of 57.8% and a spacing factor S of 2.19.

The belt ply of a reference tire 1 listed in table 1 comprises as strength members customary steel cords of ×2 construc-tion having a lay length of 14 mm. The steel has a carbon content of less than 0.86% by weight.

The belt ply of a reference tire 2 listed in table 1 comprises as strength members steel monofilaments having a lower linear density than the monofilaments of the example ply, wherein the steel likewise has a carbon content of at least 0.86% by weight. The monofilaments have a twist angle of not more than 1°. They are especially free from a twist about their axis.

The strength members of the belt plies of the test tires each have a brass coating having a copper content of 61% by weight to 70% by weight and a zinc content of 30% by weight to 39% by weight. The rubber material of the belt plies in each case has a breaking elongation of 300% to 450%.

The tensile strength and force at 1% elongation as well as the breaking strength of the respective strength member are measured according to ASTM D 2969.

The breaking elongation of the rubber material is mea-sured at room temperature according to DIN 53504. The tensile strength of the rubber material is measured at room temperature according to DIN 53504. The Shore hardness of the rubber material is measured at room temperature accord-ing to DIN 53505. The rebound elasticity of the rubber material is measured at room temperature according to DIN 53512.

To determine the compression modulus, the compression displacement and the compression stress a sample of a rubber cylinder, in particular a rubber cylinder composed of the same rubber material as the rubber material of the strength member ply, comprising the steel strength member arranged along the rotational axis of the cylinder was tested in comparison with a sample composed of a corresponding rubber cylinder free from such a strength member. The respective cylinder has a diameter of 15 mm and a length of 25 mm and the test was performed at room temperature with a pre-load of 2 N and a test speed of 5 mm/min. To determine the compression characteristics of the strength member the difference between the two samples with and without strength members is considered.

The out-of-plane bending stiffness of the respective strength member is measured by the customary 3-point bending test. The bending stiffness of the steel strength member in this case is determined as a result of a force acting on the strength member perpendicular to the exten-sion direction of the strength member. A linear piece of steel strength member is tested in this case, wherein the test length and the distance between two contact points on which the strength member is supported depends on the linear density of the strength member. The measurement of the bending strength of the monofilament of the example was performed with a test length of 50.02 mm, a distance between the two contact points of 20.02 mm, a speed of 2.503 mm/s and a preload of 0.03 N.

The twist angle is calculated as atan($\pi$×d/P)×180/$\pi$, wherein d is the diameter of the monofilament and P is the twist spacing (pitch) of the twist. To this end the monofila-ment is analyzed using an optical microscope. The diameter d (in millimeters) and a value that corresponds to half of the twist spacing P (in millimeters) is determined in this case.

The value is determined using a draw marking on the surface of the monofilament. The value is multiplied by 2 to obtain the twist spacing P.

TABLE 1

| | Reference tire 1 | Reference tire 2 | Example tire |
|---|---|---|---|
| Number of monofilaments per strength member (SM) | 2 | 1 | 1 |
| Lay length [mm] (SM) | 14 | — | — |
| Strength member cross-sectional area per meter of SMP [mm$^2$] | 134.3 | 115.5 | 119.4 |
| Linear density [g/100 m] (SM) | 112 | 75 | 99 |
| Tensile density Td [MPa/(g/100 m)] (SM) | 28.6 | 49.3 | 36.4 |
| Areal strength AS [Nmm$^2$] | 120 | 60 | 116 |
| Breaking strength [N] (SM) | 445 | 355 | 445 |
| Compression modulus [GPa] (SM) | 128 | 145 | 151 |
| Compression displacement [%] (SM) | 0.80 | 0.90 | 0.97 |
| Compression stress [N/mm$^2$] (SM) | 922 | 1384 | 1468 |
| Out-of-plane bending stiffnesses of SMs [Nmm$^2$] | 200 | 195 | 330 |
| Force [N] at 1% elongation | 320 | 232 | 300 |
| Tensile strength [MPa] (SM) | 3200 | 3700 | 3600 |

Table 2 provides a comparative assessment of the characteristics of the tested tires.

TABLE 2

| | Reference tire 1 | Reference tire 2 | Example tire |
|---|---|---|---|
| Tire durability | 100% | 90% | 100% |
| Handling | 100% | 90% | 105% |

The determined tire durability of the reference tires 1 is rated as 100%. It is apparent that reference tires 2 have a lower tire durability than reference tires 1. By contrast, the inventive example tires have a tire durability comparable to reference tires 1. The essential point is that tire durability is improved compared to reference tires 2 which, similarly to the inventive example tires, comprise steel monofilaments. This is made possible by the reduced tensile density Td compared to reference tires 2 and the higher areal strength AS together with the increased linear density and still high breaking elongation of the rubber material of the inventive example tires.

At the same time the linear density of the monofilaments and the strength member cross-sectional area per meter of strength member ply of the example tires and the reference tires 2 is markedly reduced compared to the reference tires 1, thus making it possible to achieve a rolling resistance which is still advantageously reduced compared to reference tires 1 in each case.

As indicated in table 2, the determination of the handling characteristics of the test tires has shown an advantage of the inventive example tires especially compared to reference tires 2. Here too, the increased linear density has proven advantageous.

The elevated values for compression modulus, compression displacement and compression stress and the markedly elevated out-of-plane bending stiffness have proven advantageous for continued advantageous rolling resistance, higher robustness and improved handling characteristics of the inventive example tires compared to reference tires 2. The elevated force at 1% elongation coupled with only a slight reduction in tensile strength have likewise proven advantageous.

The invention claimed is:

1. A pneumatic vehicle tire comprising a strength member ply comprising strength members made of steel which are arranged within the strength member ply substantially parallel and spaced apart from one another and are embedded in a rubber material, wherein each of the strength members is configured as a monofilament, wherein the monofilaments occupy a cross-sectional area of 98 mm$^2$ to 125 mm$^2$ per meter of strength member ply and wherein the steel has a carbon content of at least 0.86% by weight, wherein:

the monofilaments have a brass coating having a copper content of 61% by weight to 70% by weight and a zinc content of 30% by weight to 39% by weight, the monofilaments each have a linear density of 92 g/100m to 105 g/100m, the monofilaments have a tensile density Td of 34 MPa/(g/100m) to 39 MPa/(g/100m), wherein the tensile density Td is defined as the quotient of a tensile strength and the linear density of the respective strength member, the strength member ply has an areal strength AS of 109 Nmm$^2$ to 166 Nmm$^2$, wherein the areal strength AS is defined as the product of a breaking strength and a diameter d of a monofilament of the strength member ply and a spacing x between the monofilament and an adjacent monofilament of the strength member ply, the rubber material has a breaking elongation of 300% to 450%, and the monofilaments are free from twist about their axis.

2. The pneumatic vehicle tire as claimed in claim 1, wherein the monofilaments have a compression modulus of 138 GPa to 155 GPa and/or a compression displacement of 0.95% to 1.05% and/or a compression stress of 1400 MPa to 1500 MPa.

3. The pneumatic vehicle tire as claimed in claim 1, wherein the monofilaments each have an out-of-plane bending stiffness of 270 Nmm$^2$ to 340 Nmm$^2$.

4. The pneumatic vehicle tire as claimed in claim 1, wherein the monofilaments each have a tensile strength of 3500 MPa to 3700 MPa.

5. The pneumatic vehicle tire as claimed in claim 4, wherein for the monofilaments a force of 285 N to 325 N must be applied for an elongation of 1%.

6. The pneumatic vehicle tire as claimed in claim 1, wherein the strength member ply has a weight fraction of steel of 47% by weight to 63.5% by weight, and wherein t the strength member ply has a spacing factor S of 2.00 to 2.67, wherein $S=1+((y+y'+x)/(2\times d))$, wherein y is a thickness of the strength member ply on a first side of a monofilament of the strength member ply, y' is a thickness of the strength member ply on an opposite second side of the monofilament, x is a spacing between the monofilament and an adjacent monofilament of the strength member ply and d is a diameter of the monofilament.

7. The pneumatic vehicle tire as claimed in claim 6, wherein the strength member ply has a weight fraction of steel of 48.9% by weight to 62.3% by weight and wherein t the strength member ply has a spacing factor S of 2.10 to 2.50.

8. The pneumatic vehicle tire as claimed in claim 1, wherein the rubber material has a tensile strength of 15 N/mm$^2$ to 22 N/mm$^2$.

9. The pneumatic vehicle tire as claimed in claim 1, wherein the rubber material has a Shore hardness of 77 to 81 (Shore A).

10. The pneumatic vehicle tire as claimed in claim 1, wherein the rubber material has a rebound elasticity of 38 to 45.

11. The pneumatic vehicle tire as claimed in claim 1, wherein the pneumatic vehicle tire, comprises a belt and in that the strength member ply is a strength member ply of the belt.

12. The pneumatic vehicle tire as claimed in claim 11, wherein the tire is of radial construction, and wherein the belt has only two of said strength member plies, whose strength members cross at an angle of 18° to 45°.

13. The pneumatic vehicle tire as claimed in claim 1, wherein the pneumatic vehicle tire, comprises a carcass and in that the strength member ply is a strength member ply of the carcass.

14. The pneumatic vehicle tire as claimed in claim 1, wherein the monofilaments have a tensile strength of 3500 MPa to 3700 MPa, and wherein the monofilaments occupy a cross-sectional area of 119 mm$^2$ to 125 mm$^2$ per meter of strength member ply.

15. The pneumatic vehicle tire as claimed in claim 14, wherein the pneumatic vehicle tire is of radial construction, and comprises a belt, wherein the strength member ply is a strength member ply of the belt, the belt having only two of said strength member plies, whose strength members cross at an angle of 18° to 45°.

16. The pneumatic vehicle tire as claimed in claim 1, wherein the monofilaments have:

a compression modulus of 138 GPa to 155 GPa, an out-of-plane bending stiffness of 270 Nmm$^2$ to 340 Nmm$^2$, a tensile strength of 3500 MPa to 3700 MPa, and a force of 285 N to 325 N must be applied for an elongation of 1%; and wherein the monofilaments occupy a cross-sectional area of 119 mm$^2$ to 125 mm$^2$ per meter of strength member ply, and wherein the strength member ply has an areal strength AS of 116 Nmm$^2$ to 166 Nmm$^2$.

17. The pneumatic vehicle tire as claimed in claim 16, wherein the pneumatic vehicle tire is of radial construction, and comprises a belt, wherein the strength member ply is a strength member ply of the belt, the belt having only two of said strength member plies, whose strength members cross at an angle of 18° to 45°.

\* \* \* \* \*